United States Patent [19]
Ozden et al.

[11] Patent Number: 5,754,773
[45] Date of Patent: May 19, 1998

[54] MULTIMEDIA ON-DEMAND SERVER HAVING DIFFERENT TRANSFER RATES

[75] Inventors: Banu Ozden, Summit; Raveev Rastogi, New Providence; Abraham Silberschatz, Summit, all of N.J.

[73] Assignee: Lucent Technologies, Inc., Murray Hill, N.J.

[21] Appl. No.: 470,880

[22] Filed: Jun. 6, 1995

Related U.S. Application Data

[63] Continuation-in-part of Ser. No. 260,856, Jun. 16, 1994.
[51] Int. Cl.$^6$ .......... G06F 15/173; H04N 7/173; H04J 3/22
[52] U.S. Cl. .......... 395/200.33; 395/200.77; 395/615; 370/468
[58] Field of Search .......... 395/200.01, 200.08, 395/200.09, 880, 615, 154, 872, 250, 200.3, 200.33, 200.77, 612; 348/7; 370/61, 94.1, 118, 468; 386/112

[56] References Cited

U.S. PATENT DOCUMENTS

| 5,367,522 | 11/1994 | Otani | 370/84 |
|---|---|---|---|
| 5,519,435 | 5/1996 | Anderson | 348/8 |
| 5,543,861 | 8/1996 | Harradine et al. | 348/718 |
| 5,550,577 | 8/1996 | Verbiest et al. | 348/7 |
| 5,566,208 | 10/1996 | Balakrishnan | 375/240 |
| 5,572,645 | 11/1996 | Dan et al. | 395/501 |
| 5,583,561 | 12/1996 | Baker et al. | 348/7 |
| 5,600,573 | 2/1997 | Hendricks et al. | 364/514 R |

*Primary Examiner*—Gopal C. Ray

[57] ABSTRACT

A multimedia on-demand server including a randomly-accessible library of multimedia programs (such as movies stored on magnetic or optical disks), a limited amount of RAM to buffer and store selected portions of programs retrieved from the library, and an interface that switchably routes program material from the library and RAM buffers to an audience of viewers. The server employs a restricted retrieval strategy and a novel storage allocation scheme that enable different portions of one or more programs to be continuously retrieved and selectively routed to a large number of on-demand viewers, while at the same time minimizing the amount of the RAM required to effect this service. The on-demand server also responds to viewer-generated commands to control the viewing of a program. In a particular embodiment, these commands include video tape player-like operations such as fast-forward, rewind and pause.

23 Claims, 7 Drawing Sheets

| | |
|---|---|
| 1 | $t_c \cdot r_d$ bits |
| 2 | $t_c \cdot r_d$ bits |
| 3 | $t_c \cdot r_d$ bits |
| 4 | $t_c \cdot r_d$ bits |
| 5 | $t_c \cdot r_d$ bits |
| 6 | $t_c \cdot r_d$ bits |
| 7 | $t_c \cdot r_d$ bits |
| 8 | $t_c \cdot r_d$ bits |
| 9 | $t_c \cdot r_d$ bits |
| ... | ... |
| p | $t_c \cdot r_d$ bits |

FIG. 2B

| | 1 | 2 | 3 | ... | n |
|---|---|---|---|---|---|
| 1 | d bits | d bits | d bits | ... | d bits |
| 2 | d bits | d bits | d bits | ... | d bits |
| 3 | d bits | d bits | d bits | ... | d bits |
| 4 | d bits | d bits | d bits | ... | d bits |
| 5 | d bits | d bits | d bits | ... | d bits |
| 6 | d bits | d bits | d bits | ... | d bits |
| 7 | d bits | d bits | d bits | ... | d bits |
| 8 | d bits | d bits | d bits | ... | d bits |
| 9 | d bits | d bits | d bits | ... | d bits |
| ... | ... | ... | ... | ... | ... |
| p | d bits | d bits | d bits | ... | d bits |

MULTIMEDIA ON-DEMAND SERVER HAVING DIFFERENT TRANSFER RATES

CONTINUATION DATA

This application is a continuation-in-part of application Ser. No. 08/260,856, filed Jun. 16, 1994.

TECHNICAL FIELD

The invention relates to providing multiple-user access to a multimedia database, and in particular, to on-demand access to such a database.

BACKGROUND OF THE INVENTION

The movie on demand ("MOD") concept has become exceedingly popular within the telecommunications, computer and cable television industries. Viewers that subscribe to a MOD service have access to a much wider range of content than subscribers to ordinary broadcast-based television or cable networks. MOD subscribers can, at any time they wish, view a movie that they select from among a particular set of available movies. Furthermore, while watching the selected movie, a MOD subscriber can typically control the viewing via an interface that provides video tape player functions. For example, a subscriber may pause and then resume viewing the movie, or skip forward or backward within the movie (analogous to the fast-forward and rewind functions of a video tape player). Thus, MOD systems differ substantially from today's standard broadcast television and cable systems in which, at any given time, all the viewers see the same portion of the same movie, and viewers have no control over its transmission.

Until recently, relatively low telecommunication and cable network bandwidths and limited-capacity video storage technologies made offering MOD services to a significant number of viewers a difficult task. However, present optical fiber networks have bandwidths of several gigabits/second. Furthermore, not only is it now possible to store video data in digital form, but it is also possible to obtain compression ratios that are as high as forty to one. For example, a 30 frames/second video signal, can be compressed to only 1.5 megabits/second by employing the Motion Picture Experts Group algorithm ("MPEG compression") set forth by D. Gall in Communications of the ACM, 34(4), pages 46-58, "MPEG: A video compression standard for multimedia applications," April 1991. Thus, using present networking technology, it is possible to concurrently transmit independent video streams to thousands of viewers.

Although the problem of transmitting video data has been considerably simplified by the availability of high bandwidth networks, the design and implementation of a practical MOD storage server that enables the simultaneous retrieval of different portions of different movies by different subscribers remains a significant technological hurdle. A storage architecture for a MOD server must facilitate the continuous retrieval of movies, as well as provide video tape player-like functions, and the ability to simultaneously service multiple subscribers. In addition, the server must have a relatively low-cost.

Generally, a MOD server will include a cache for temporarily storing the movies that are to be made available to subscribers. These movies will be loaded onto the cache from a library that provides a permanent storage location for the movies (e.g., an addressable collection of video tapes or disks). In its basic configuration, the cache can consist of a large random access memory ("RAM") having a flat architecture. However, this approach will increase the cost of the MOD server substantially due to the vast amounts of semiconductor RAM needed to store any given movie, and the high cost of RAM. For example, an MPEG compressed 100 minute movie, having an average bandwidth of 1.5 megabits/second, will require approximately 1.1 gigabytes of RAM storage. Assuming the cost of RAM is $50.00 per megabyte, the cost of the RAM component alone for a single movie MOD server would approach $55,000. This cost would rise to $5.5 million for a RAM-based cache capable of storing 100 movies.

It is well known in the art to provide systems that facilitate the continuous retrieval of video and audio data from a storage medium, such as a disk, in response to multiple concurrent requests for the retrieval of multimedia objects residing on a disk (see D. P. Anderson, Y Osawa, R. Govidan, A file system for continuous media, ACM Transactions on Computer Systems, 10(4), pages 311–337, November 1992; H. J. Chen, T. D. C. Little, Physical storage organizations for time-dependent data, Foundations of Data Organization and Algorithms, pages 19–34, Springer-Verlag, October 1993; P. V. Rangan, H. M. Vin, Efficient storage techniques for digital continuous multimedia, IEEE Transactions on Knowledge and Data Engineering, 5(4), pages 564–573, August 1993; P. V. Rangan, H. M. Vin, S. Ramanathan, Designing an on-demand multimedia service, IEEE Communications Magazine, 1(1), pages 56–64, July 1992; C. Yu, W. Sun, D. Bitton, Q. Yang, R. Bruno, J. Tulis, Efficient placement of audio data on optical disks for real-time applications, Communications of the ACM, 32(7), pages 862–871, July 1989). However, under these schemes, concurrent requests are serviced in a round-robin fashion retrieving successive portions of multimedia objects and performing multiple seeks in each round. Thus, the schemes are unsuitable for handling large number of requests concurrently.

SUMMARY OF THE INVENTION

The aforementioned problems are solved, in accordance with the principles of the invention, by providing a method for storing and transmitting sets of program information having varying transfer rates. The sets of program information may be stored on multiple disks. A restricted retrieval strategy and a novel storage allocation scheme are employed that enable different portions of one or more programs to be continuously retrieved and selectively routed to a large number of on-demand viewers, while at the same time minimizing the amount of memory space required to effect this service.

DETAILED DESCRIPTION OF THE INVENTION

Figure 1:
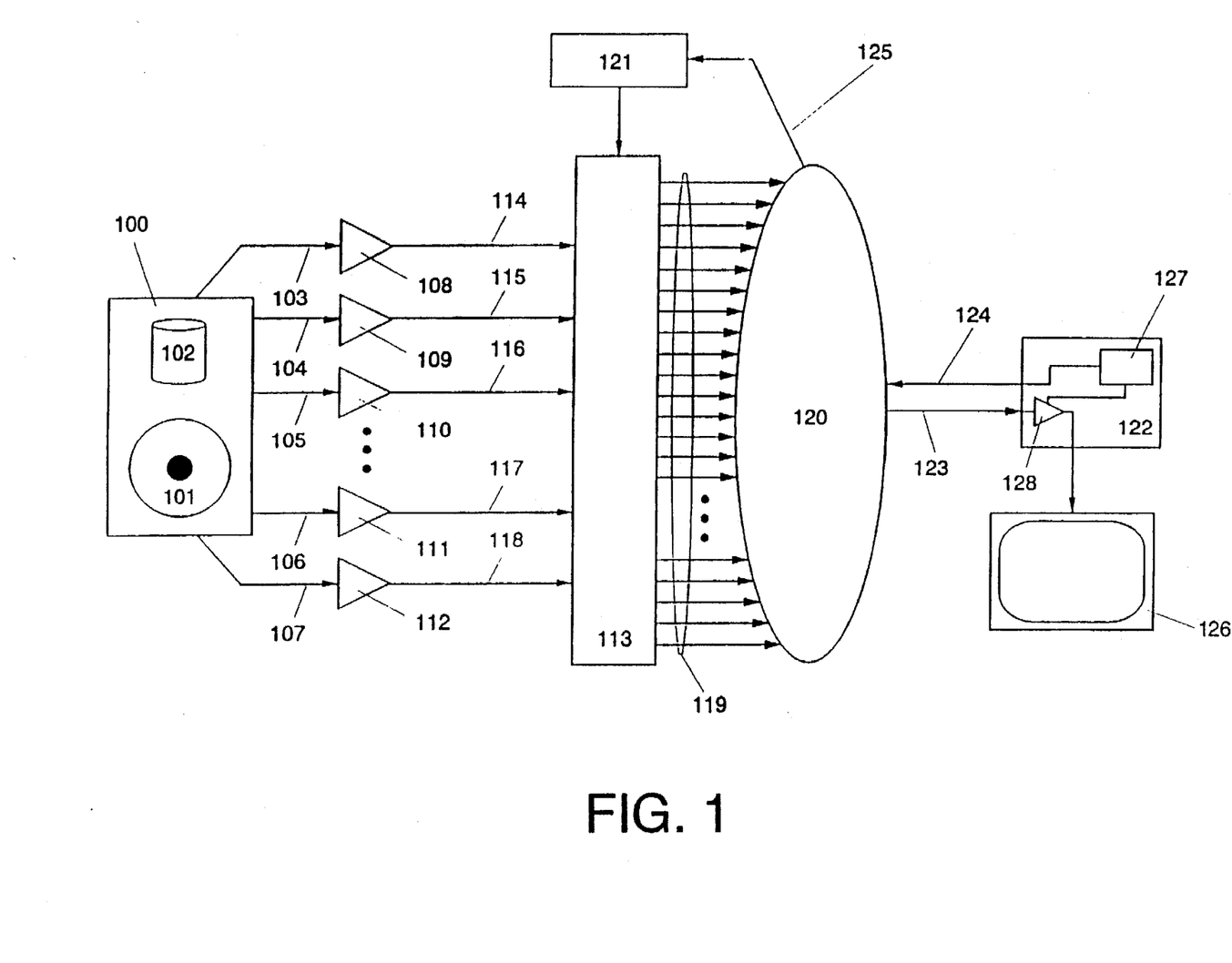
FIG. 1 shows, in simplified block diagram form, the architecture of a multimedia on-demand server incorporating an embodiment of the invention.

FIG. 1 shows, in simplified form, the architecture of a multimedia on-demand server incorporating an embodiment of the invention. Specifically shown is multimedia program library 100, which includes randomly-accessible magnetic disk labeled 101 and RAM 102, both of which serve to store digital program information representing audio and video signals that comprise a feature-length movie. For reasons that will become evident, digital information representing a small portion of the beginning of the movie is stored within RAM 102, and remainder of the movie information is stored upon magnetic disk 101. This digital program information is retrieved from RAM 102 and magnetic disk 101, and transmitted along lines 103–107 to RAM buffers (108–112). The output of each RAM buffer is linked to switch 113 via one of lines 114–118, and the output of switch 113 may be selectively linked to individual viewers via transmission lines 119 and telecommunication network 120. Switch 113 is a programmable switch adapted to controllably direct the distribution and transmission of multimedia signals among the various transmission lines in response to commands from controller 121 (such programmable switches are well known in the art). Only 20 transmission lines are shown exiting switch 113; however, as indicated by the dots shown in FIG. 1, transmission lines can be added to provide for an increased number of viewers.

Telecommunication network 120 is connected to program decoder/viewer interface ("decoder/interface") 122 via lines 123 and 124. As shown, line 123 serves to provide the viewer with program information, and line 124 serves to convey viewer generated information into the network. This viewer generated information is then communicated to controller 121 via line 125. Decoder/interface 122 is also linked to video display 126.

The rate, $r_d$, at which program information is transmitted to network 120 (and therefore to viewers) from video switch 113 cannot exceed the bandwidth of any given one of the transmission lines (collectively labeled 119). However, this transmission rate must be sufficiently high so as to provide enough data to generate thirty frames of video per second (the standard television rate). Within the system of FIG. 1, $r_d$ is 1.5 megabits/second (0.1875 megabytes/second)—a rate suitable for supporting the transmission of thirty frames of MPEG compressed video per second. The rate of retrieval, $r_r$, of program information from magnetic disk 101 on the order of 20 megabytes/second, with a latency, $t_{lat}$, (i.e., the maximum time to access and read or write a random location upon the magnetic disk), of 35 milliseconds. Magnetic disks having 10,000 megabyte capacities, 20 megabyte/second retrieval rates, and maximum latencies of 35 milliseconds are commercially available (for example, the ST410800W Elite 9 magnetic disk drive manufactured by Seagate Technology, Inc. of Scotts Valley, Calif.). A storage capacity of approximately 10,000 megabytes enables program library 100 to store on the order of eight 100 minute movies compressed in the 1.5 megabits/second MPEG format.

Within the system illustrated in FIG. 1, an optimal program retrieval and storage allocation scheme is employed to maximize the number of potential on-demand program viewers, while keeping RAM buffer capacity requirements to a minimum. In this scheme, the retrieval of program information (such as a movie) initiated at a given time is referred to as a phase. For example, if a first on-demand viewer initiated retrieval of a particular movie from program library 100 at 1:00, another on-demand viewer initiated retrieval of that same movie at 1:10, and yet another on-demand viewer initiated retrieval of the movie at 1:15, each viewer would be receiving a separate phase of the movie. Naturally, each viewer would receive the particular phase via different transmission lines (collectively labeled 119), and via separate connections to network 123. The maximum number of concurrent phases, p, which can be supported by the system of FIG. 1 is given by:

$$p = \left\lfloor \frac{r_t}{r_d} \right\rfloor = \left\lfloor \frac{20 \text{Mbytes/s}}{0.1875 \text{Mbytes/s}} \right\rfloor = 106.$$

The amount of RAM buffer required to support each phase is kept to a minimum by employing a restricted retrieval scheme, referred to as phase-constrained allocation. This allocation scheme eliminates seeks to random disk locations, and thereby enables the concurrent retrieval of p phases, while allowing the size of the RAM buffer for each phase to be kept constant—independent of the number of phases being retrieved and the latency associated with disk 101.

In order to support p concurrent phases within the system of FIG. 1, the movie data stored within program library 100 must be separated into p contiguous partitions. If l is the length, in seconds, of a movie stored within program library 100, then the movie occupies $l \cdot r_d$ bits. The system of FIG. 1 is configured so that movie data is read from program library 100 in d size portions, where d is arbitrarily chosen to be 50 kilobits. As will become evident, each buffer within the system of FIG. 1 must have a capacity of 2d, and 100 kilobit RAM buffers can be easily and inexpensively obtained. Ideally, the length l of the movie is set so that $(l \cdot r_d)$ is a multiple of $(p \cdot d)$ to assure that it may be retrieved in an integer number of d sized portions after it is partitioned into p segments. Of course, any movie can be modified to conform to this constraint by appending advertisements, previews or blank frames to lengthen the movie, or by editing the movie to shorten it.

Figure 2A:
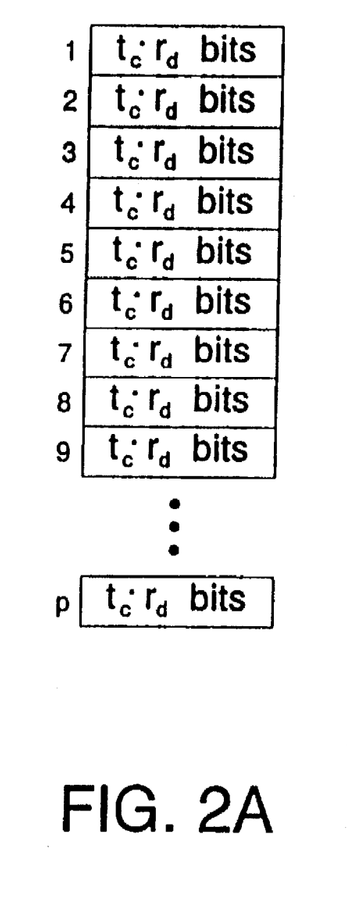
FIG. 2A is a depiction of a (p·1) partition of data representing a movie retrieved from within program library 100 of FIG. 1.

Each of these p data partitions can be visualized as a (p·1) vector (see FIG. 2A), wherein each row within the vector contains $t_c \cdot r_d$ bits of movie data, and where $$\text{minimum phase difference} = t_c = \frac{l}{p}.$$

Assuming a 100.7 minute movie (an arbitrary length chosen because it is divisible by (p·d)), the value of $t_c$ is computed as follows:

$$t_c = \frac{l}{p} = \frac{100.7 \text{minutes} \cdot 60 \text{s/minute}}{106} = 57 \text{ s}$$

Given such an arrangement, the smallest phase difference that the system of FIG. 1 will support is equal to $t_c$, because the first bit in any two adjacent rows within the (p·1) vector will be $t_c$ seconds apart.

Since movie data in each row is retrieved in portions of size d, a row can be further viewed as consisting of n portions of size d, where:

$$n = \frac{t_c \cdot r_d}{d} = \frac{57\text{s} \cdot 1.5\text{Mbits/s}}{50\text{kbits}} = 1710.$$

Figure 2B:
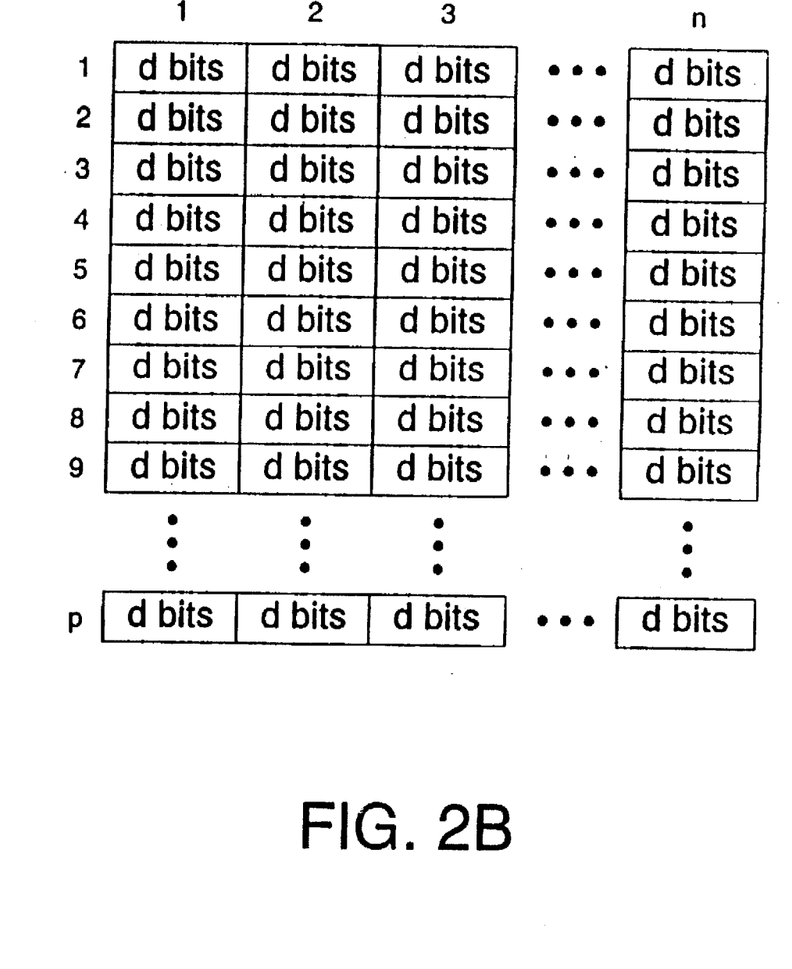
FIG. 2B is a depiction of p-by-n matrix arrangement of data representing a movie retrieved from within program library 100 of FIG. 1.

Thus, the movie can be represented as a (p·n) matrix of data as shown in FIG. 2B. Each portion in the matrix can be uniquely identified by the row and column to which it belongs.

The movie is sequentially stored within program library 100 in column-major form. That is, all the data within the first column of FIG. 2B is stored within program library 100, followed by all the data within the second column of FIG. 2B, and the next column, until finally, the data within the nth column has been stored. All of this movie data is stored upon disk 101, with the exception of the initial $(t_{lat} \cdot r_d)$ bits of the column-major movie data. These initial bits must be stored within RAM 102 to compensate for the inherent delay of repositioning the heads of disk 101. RAM 102 need only have a capacity of $(t_{lat} \cdot r_d)$ bits, which is only 52,500 bits for the system of FIG. 1. The necessity of this combination RAM/disk storage scheme is explained below.

By sequentially reading the column-major form data from program library 100, movie data from rows 1 through p are retrieved at a rate $r_d$. For each of the p rows of the data matrix illustrated in FIG. 2B, there is a dedicated line linking program library 100 and video switch 113. Similarly, for each data matrix row there is a dedicated RAM buffer into which consecutive portions of a row are stored and retrieved. For purposes of illustration, only five lines linking program library 100 and video switch 113, and only five RAM buffers (with their associated input and output lines) are explicitly shown in FIG. 1. As indicated by the dots, additional buffers and lines are provided to accommodate the p of columns in the data matrix. As the data from each row is retrieved from disk it is routed through the corresponding dedicated line to the corresponding dedicated buffer.

Each of the RAM buffers (108–112) is implemented as a circular buffer. That is, if while writing into a buffer, the last memory location within that buffer is reached, then further bits are written at the beginning of the RAM buffer. Similarly, while reading data, if the last memory location of a buffer is read, then subsequent bits are read from the beginning of the buffer. To support the above circular storage scheme, every $t_c/n$ seconds, the next consecutive column of movie data is retrieved from disk and stored in a RAM buffer. The size of each RAM buffer is fixed at a size 2d. For each column of data within the matrix of FIG. 2B, d bits of data associated with a particular row are transmitted to viewers from a first group of d memory sites within the RAM buffer dedicated to the data stored in that particular row, while the d bits of data associated with that same row, but the next consecutive column is stored in another d memory sites of that same dedicated buffer. This arrangement of reading column-major data from program library 100 and transmitting it to switch 113 via the dedicated lines and RAM buffers makes p individual streams of data continually and concurrently available to viewers. Each of these streams represents a different $t_c$ second segment of the movie. For example, the segment provided to switch 113 via line 103, buffer 108 and line 114 is the movie from time 0 through $t_c$ (0–57 seconds); the segment provided to switch 113 via line 104, buffer 108 and line 115 is the movie from time $t_c$ through $2t_c$ (57–114 seconds); the segment provided via line 105, buffer 110 and line 116 is the movie from time $2t_c$ through $3t_c$ (114–171 seconds); and so on through line 107, buffer 112 and line 118 that provides the final movie segment (corresponding to time $(p-1)t_c$ through $pt_c$).

Once the nth column of data has been retrieved, the disk heads must be repositioned to the start of disk 101 so that the data corresponding to the first column may be retrieved again. This repositioning operation that will take approximately 35 milliseconds (the maximum latency time, $t_{lat}$, of the disk). During this 35 millisecond latency period, no data will be available from disk 101. This would present a problem with respect to the retrieval of first column data; however, during this latency period, data is retrieved from RAM 102. As stated above, the initial $(t_{lat} \cdot r_d)$ bits of the movie stored in program library 100 were stored in RAM 102 for the express purpose of compensating for the inherent delay in repositioning the heads of disk 101 from the nth column position to the beginning of the disk. After all the data has been retrieved from RAM 102, the column-major retrieval process continues with data from disk 101 (the heads of which have been repositioned to the beginning of the disk and are poised to retrieve the $((t_{lat} \cdot r_d)+1)$ bit of movie data).

To obtain a continuous view of the movie stored in program library 100, a particular viewer sequentially accesses each of the available p data streams via switch 113 and network 120 controller 121. For a viewer utilizing video display 126, the various streams of data exiting the RAM buffers (108–112) would be selectively routed to line 123 via switch 113 in response to commands communicated to controller 121 via decoder/interface 122 and line 124. Decoder/interface 122 receives and decodes the data (which is encoded in a compressed MPEG format), and transmits it to video display 126 for viewing. Viewer interfaces adapted to decode MPEG video signals are well known in the art.

Since p is defined by the ratio of $r_t/r_d$, it follows that:

$$\frac{p \cdot d}{r_t} \leq \frac{d}{r_d}$$

$$\frac{106 \cdot 50\text{kbits}}{20\text{Mbytes/s}} \leq \frac{50\text{kbits}}{1.5\text{Mbits/s}}$$

$$0.0331\text{s} \leq 0.0333\text{s}$$

Therefore, the time required to retrieve an entire column of data from program library 100 (the retrieval rate from disk being $r_t$ is less than the time required to transfer d bits of program information to a viewer at the rate $r_d$. As a result, while a first portion of data (representative of a given segment of the movie having a duration of $t_c/n$ seconds) is being consumed by a viewer at a rate $r_d$, the next portion of data (representative of the next consecutive $t_c/n$ segment of the movie) can be retrieved. This storage and retrieval arrangement guarantees an uninterrupted data transfer rate of $r_d$ to the various viewers.

Within the system of FIG. 1, on-demand video tape player-like functions (such as play, fast-forward, rewind and pause) can be effected. These functions are performed in response to commands transmitted, in real-time to controller 121 by viewers. The transmission of these commands to controller 121 is effected via processor 127 within decoder/ interface 122, line 124, network 120 and line 125. Naturally, each of these commands received by the system of FIG. 1 is viewer-specific. That is, each received command is identified by the system as originating from a particular viewer, and in response, the system controls or modifies the video signal being transmitted to that viewer. Multimedia network systems capable of accepting, recognizing, and responding to viewer-specific commands from a large number of viewers are known in the art (i.e., pay-per-view and interactive cable television systems).

Figure 3:
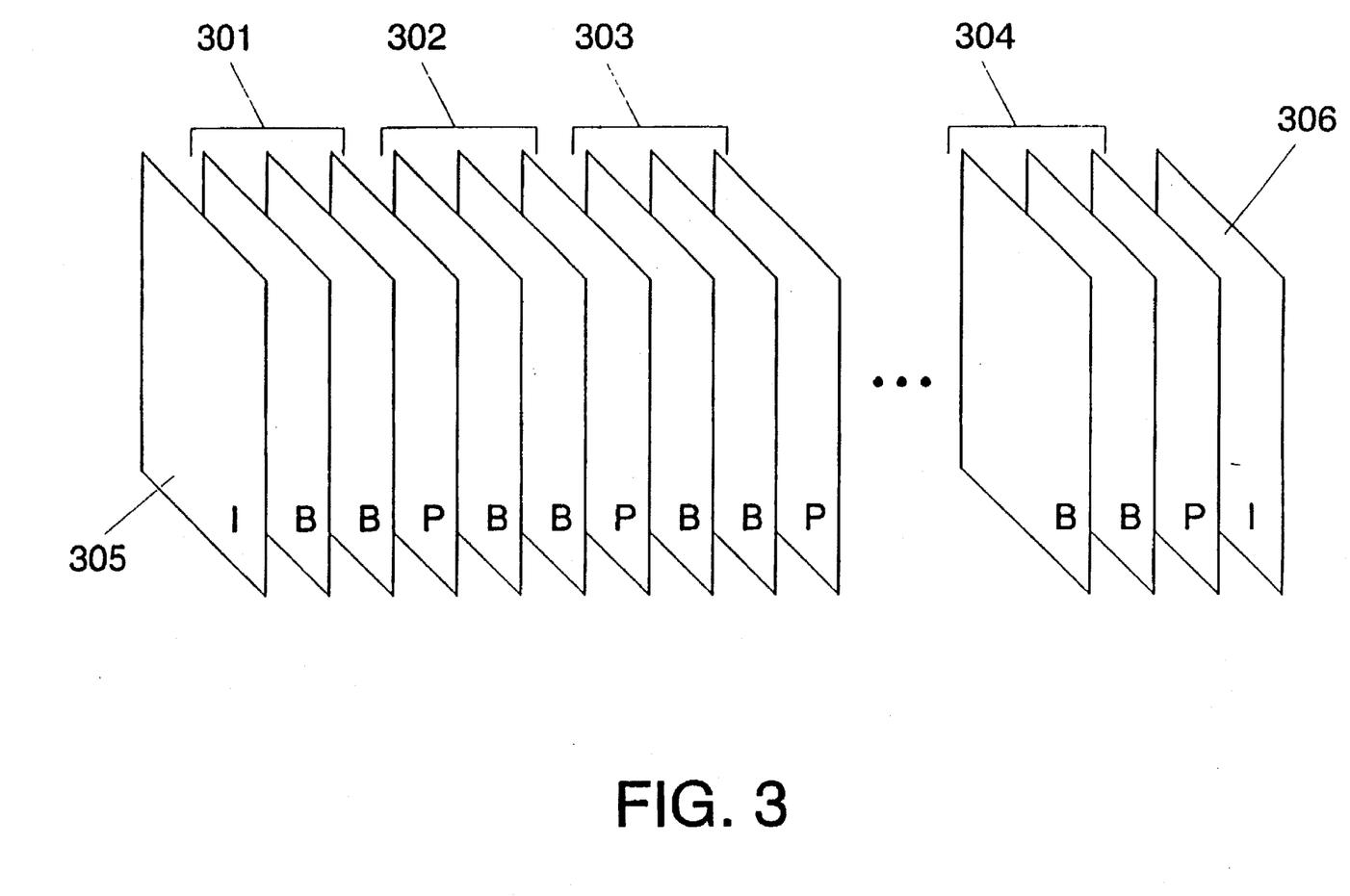
FIG. 3 is a depiction of the frame sequencing of the MPEG-encoded video transmitted to viewers within the system of FIG. 1.

The video transmitted to viewers by the system of FIG. 1 is 1.5 megabit/second MPEG compressed, and the invention exploits the properties of this MPEG encoding to facilitate the on-demand video tape player-like functions. MPEG video is comprised of a sequence of intra ("I-frame"), predicted ("P-frame") and bi-directional ("B-frame") frames. I-frames are stand-alone frames and can be decoded independently of other frames. P-frames are coded with reference to the previous frame, and thus can be decoded only if the previous frame is available. The decoding of B-frames requires the closest I or P-frame preceding and following the B-frame. I-frames consume the most bandwidth, while B-frames consume the least (the ratio of the bandwidths consumed by the I, P and B frames is 5 to 3 to 1, respectively). Any given sequence of frames beginning with an I-frame and ending with a P-frame is referred to as an independent sequence, since such a sequence contains references for every B-frame within it, and can therefore be decoded by an MPEG decoder. The organization of MPEG frames is quite flexible; the frequency of I-frames being a function of the particular type of MPEG encoder being employed. The MPEG compressed movie stored within program library 100 of FIG. 1 is assumed to have 2k+1 groupings of BBP frames between any two consecutive I-frames, where k is a positive integer. In FIG. 3 four of these BBP groupings (labeled 301, 302, 303 and 304) are explicitly shown to occur between I-frames 305 and 306. In addition to I, B and P frames, within the MPEG encoding scheme there is also a variation of the P-frame referred to as a repeat ("R-frame") frame. When an MPEG decoder receives an R-frame immediately after it has received a P-frame or a previous R-frame, the decoder outputs the same frame as the previous one output by it.

The MPEG compressed movie data is transmitted at a rate of $r_d$=1.5 megabits/s to each viewer. As shown in FIG. 1, a viewer receives the video via a decoder/interface (122). This decoder/interface receives MPEG compressed movie data line 123, and outputs frames to a video display (126) at a rate of 30 frames/second. Since the consumption rate of the decoder/interface may not be uniform (it can fall below or exceed 1.5 megabits/s), the contents of local buffer 128 within the decoder/interface are continuously monitored by processor 127. Processor 127 discards BBP frames immediately preceding an I-frame if local buffer 128 overflows, and inserts additional R-frames between P and I-frames if local buffer 128 underflows. This deletion and insertion of frames will not adversely affect the quality of the viewed movie as each frame is only displayed for 1/30th of a second.

As described above, the n contiguous portions of each of the p rows of data within the matrix of FIG. 2B are sequentially stored in and retrieved from a dedicated RAM buffer at a rate $r_d$. The n portions of the first matrix row are stored in and retrieved from RAM buffer 108, the n portions of the second matrix row are stored in and retrieved from RAM buffer 109, and so on. On-demand video tape player-like functions (such as begin, pause, fast-forward, rewind and resume) are executed within the system of FIG. 1 as follows:

begin

The "begin" function (analogous to the play function on a tape player) initiates the viewing of a movie. This command, when received by controller 121, causes the first frame of the movie to be transmitted to the viewer that issued the command. As discussed above, the initial frames (the first 57 seconds) of the movie are associated with the data of the first row of the matrix if FIG. 2B, and this data is transmitted to viewers via buffer 108. The transmission of the movie data to the viewer can start once RAM buffer 108 contains the first bit of the first frame of the movie. In the worst case, (n·d) bits may need to be stored in and transmitted from this buffer before the first bit of the first frame is arrived at. This can delay the initiation of the movie by as much as 57 seconds ($t_c$) from the receipt of the begin command by controller 121. After transmission is initiated, data will be sent to that viewer in sequential order from the first RAM buffer (108) to the last (pth) RAM buffer (112), providing the movie stored within program library 100 to the viewer in a continuous fashion. Naturally, as will become clear, this continuous "playing" of the initiated movie is subject to subsequent commands issued by the viewer.

pause

Upon receipt of the "pause" function command by controller 121, the system responds by effectively freezing the movie being transmitted to the viewer that issued the command upon a single frame. To accomplish this, following the first P-frame immediately preceding the first I-frame transmitted to the viewer that issued the command, the processor (127) within that viewer's decoder/interface (122) inserts an R-frame. This R-frame causes the most recently received P-frame to be held in the viewer's local buffer (128) and repeatedly sent to the viewer's video display (126). Simultaneously, the receipt of the pause command by controller 121 terminates the transmission of any new frames (i.e., additional data) to the viewer from switch 113 and network 120.

fast-forward

Upon receipt of a "fast-forward" command issued by a viewer receiving video via decoder/interface 122, controller 121 executes the following steps:

1. Continue the normal transmission of compressed movie data to the viewer until a P-frame is transmitted from the RAM buffer and the next consecutive RAM buffer contains an I-frame.

2. Transmit movie data beginning with the I-frame in the next consecutive RAM buffer.

3. Continue with Step 1 until a new command is received. For example, if the viewer was receiving video from RAM buffer 108, and issued a fast-forward command, the viewer would continue to receive normal speed video from RAM buffer 108 until a P-frame was received and an I-frame was available within RAM buffer 109. At this point, the viewer would then receive video from RAM buffer 109, beginning with the available I-frame and continuing through a P-frame, until an I-frame was available from within RAM buffer 110. When the I-frame within RAM buffer 110 was available, the viewer would receive video from RAM buffer 110, beginning with the available I-frame and continuing through a P-frame. The process would continue from RAM buffer to RAM buffer in this fashion. This fast-forward viewing would provide the viewer with a rapid succession of brief sequences of video frames showing portions of the movie that would normally be separated from each other by approximately $t_c$ seconds.

skip forward

This command allows a viewer to instruct the system to directly skip forward a specified amount of time within a movie. Upon receipt of this command, controller 121 would direct the video stream exiting from the particular RAM buffer that best corresponds to this skip to the viewer. For example, if the viewer were currently receiving the tenth second of a movie from RAM buffer 108, and issued a command to skip forward two minutes, controller 121 would cause switch 113 to direct the video stream exiting RAM buffer 110 to the viewer (as this particular RAM buffer contains the data associated with the 130th second of the movie). Viewing of the movie would continue at normal speed with frame corresponding to the 130th second of the movie within the stream exiting from RAM buffer 110. In the worst case, this requested skipping would be delayed by $t_c$ seconds (n·d bits may need to be stored in and transmitted from the RAM buffer 110 before the desired is arrived at).

rewind

This operation is implemented in a similar fashion to the fast-forward operation, except that instead of jumping ahead to the next consecutive RAM buffer, rewind causes a jump to the preceding RAM buffer as follows:

1. Continue the normal transmission of compressed movie data to the viewer until a P-frame is transmitted from the RAM buffer and the previous consecutive RAM buffer contains an I-frame.

2. Transmit movie data beginning with the I-frame in the previous consecutive RAM buffer.

3. Continue with Step 1 until a new command is received. If the viewer was receiving video from RAM buffer 110, and issued a rewind command, the viewer would continue to receive normal speed video from RAM buffer 110 until a P-frame was received and an I-frame was available within RAM buffer 109. At this point, the viewer would then receive video from RAM buffer 109, beginning with the available I-frame and continuing through a P-frame, until an I-frame was available from within RAM buffer 108. When the I-frame within RAM buffer 108 was available, the viewer would receive video from RAM buffer 108, beginning with the available I-frame and continuing through a P-frame. The process would continue from RAM buffer to RAM buffer in this fashion. This would provide the viewer with a rapid succession of brief sequences of video frames showing portions of the movie that would normally be separated from each other by approximately $t_c$ seconds.

skip backward

A viewer issues this command to instruct the system to directly skip backward a specified amount of time within a movie. Upon receipt of this command, controller 121 would direct the video stream exiting from the particular RAM buffer that best corresponds to this skip to the viewer. For example, if the viewer were currently receiving the 120th second of a movie from RAM buffer 110, and issued a command to skip back one minute, controller 121 would cause switch 113 to direct the video stream exiting RAM buffer 109 to the viewer (as this particular RAM buffer contains the data associated with the 60th second of the movie). Viewing of the movie would continue at normal speed with frame corresponding to the 60th second of the movie within the stream exiting from RAM buffer 109. In the worst case, this requested skipping would be delayed by $t_c$ seconds (n·d bits may need to be stored in and transmitted from the RAM buffer 109 before the desired is arrived at).

resume

This command is issued by a viewer resume normal viewing after a fast-forward, rewind or pause command.

In case where the previously issued command was either fast-forward or rewind, the resume command instructs controller 121 to initiate the normal transmission of the data stream from whatever RAM buffer is the current RAM buffer when the command is issued. For example, if the viewer had issued a fast-forward command, and as a result was presently receiving a sequence of frames from RAM buffer 110, normal, sequential transmission of data to the viewer would resume at that point in the data stream from RAM buffer 110.

If, however, the previous command issued by the viewer was pause, then the viewer is presently repeatedly viewing a particular P-frame that is stored in local buffer 128. Upon receipt of a resume command, processor 127 instructs controller 121 to re-initiate the normal, sequential viewing of the movie beginning with the first I-frame that would have followed the particular P-frame that has been repeated to the viewer from local buffer 128. In the worst case, this requested resumption of normal viewing will be delayed by $t_c$ seconds (n·d bits may need to be stored in and transmitted from the current RAM buffer before the desired I-frame is arrived at).

In the above described embodiment, the fast-forward and rewind functions provide a rapid succession of brief sequences of frames to the viewer. Because each of these sequences is taken from a different sequential RAM buffer, they would normally be separated from one another by approximately $t_c$ seconds (57 seconds). This 57 second separation is referred to as the granularity of the fast-forward and rewind functions. The lower the normal separation time would have been between the sequences that comprise the fast-forward and/or rewind video, the smaller the granularity of the function.

While a granularity equal to the $t_c$ of a system may prove acceptable to the majority of viewers using a system like that illustrated in FIG. 1, a small percentage of viewers may desire or require fast-forward and rewind functions that offer reduced granularity.

Figure 4:
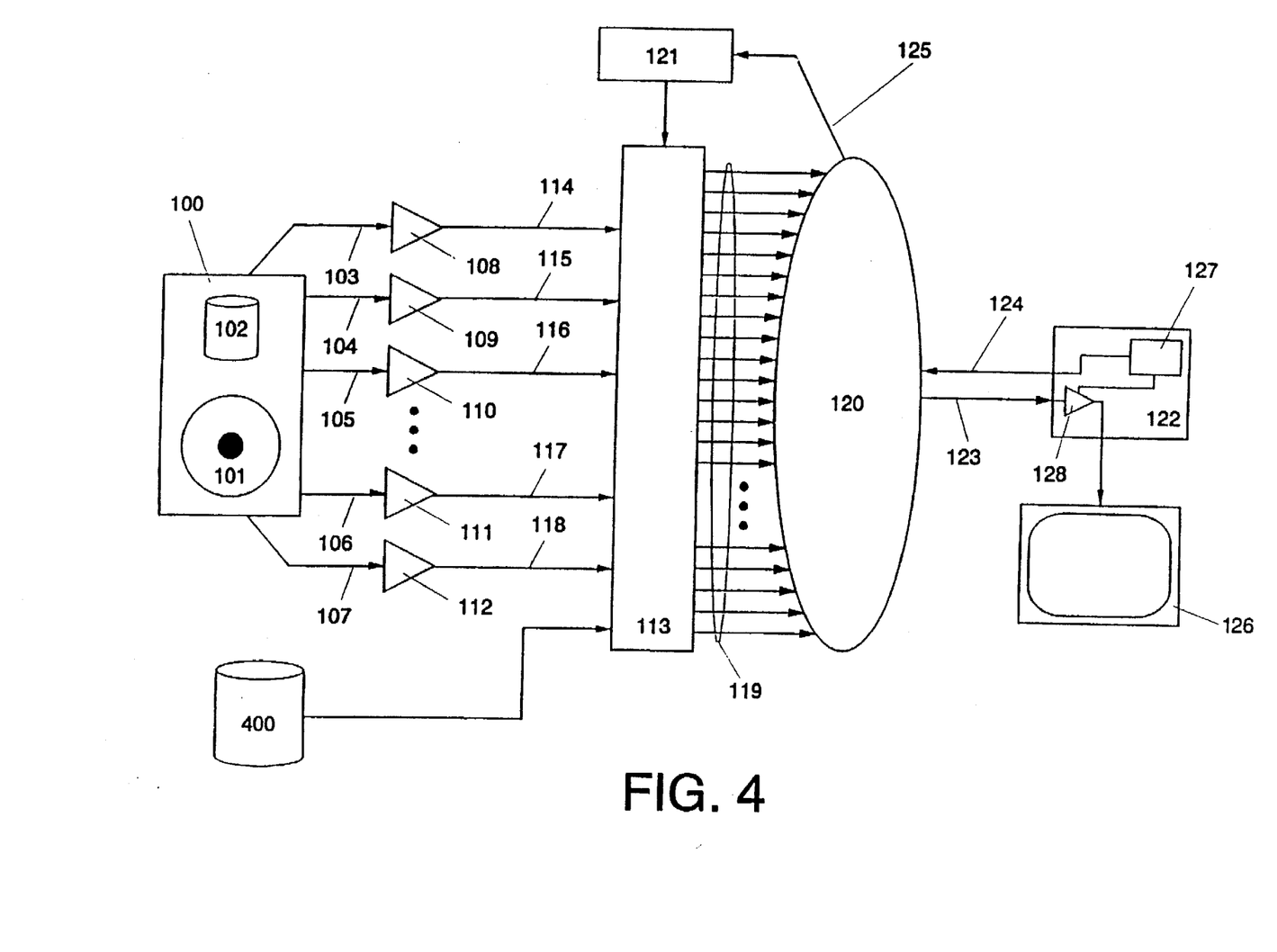
FIG. 4 shows, in simplified block diagram form, the architecture of a multimedia on-demand server incorporating a dedicated RAM that stores a high-speed version of a movie.

One way of offering reduced granularity fast-forward and rewind functions to viewers is to store a high-speed version of the entire movie within a dedicated RAM collocated with the program library (RAM 400 in FIG. 4). As stated above, the full-length, normal speed version of the movie is stored in compressed MPEG format where 2k+1 groupings of BBP frames are situated between any two consecutive I-frames. The high-speed version of the movie is arrived at by eliminating the 2k BBP frame sequences from between the IBBP sequences. This results in a representation of the movie that requires only 1/(k+1) times the storage space required by the normal movie (thereby reducing the size and cost of the RAM that will be required to store the high-speed version of movie). When a fast-forward or rewind command is issued by a viewer, the transmission of data to that viewer is switched from the standard RAM buffers (108–112) to dedicated RAM 400, and the viewer receives only the IBBP frame sequences of the movie. When a resume command is sent by the viewer, the normal transmission of the data stream is commenced from whatever RAM buffer stores the IBBP frame that is identical to the particular IBBP frame being transmitted to the viewer from the high-speed RAM. For example, assume that the viewer had issued a rewind command, and as a result was presently receiving a particular IBBP sequence stored in RAM 400, which under normal viewing conditions would have been retrieved from RAM buffer 110. The resumption of normal speed, sequential transmission of movie data to the viewer would commence from RAM buffer 110 at the point in the data stream that would normally follow the particular IBBP sequence that the viewer had just received from RAM 400. Naturally, there may be a delay of as long as $t_c$ seconds between the issuance of a resume command and the resumption of normal viewing (n·d bits may need to be stored in and transmitted from RAM buffer 110 before the desired frame is arrived at).

Reduced granularity fast-forward and rewind functions may also be facilitated by storing a high-speed version of the movie on disk. However, the storage of two entirely separate high-speed versions is required—A fast-forward version stored with the IBBP sequences in a forward order, and a rewind version stored with the IBBP sequences in reverse order.

Figure 5A:
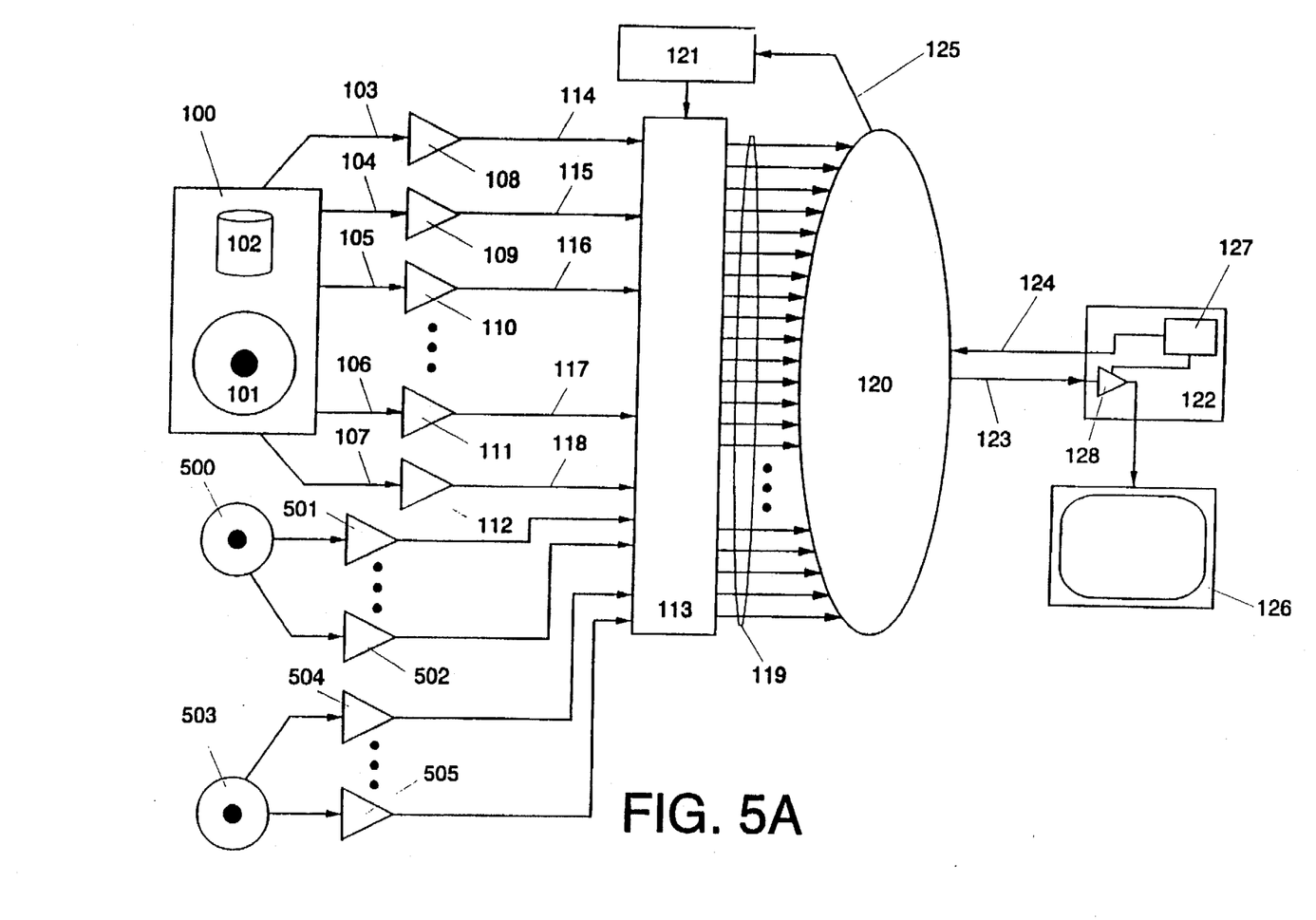
FIG. 5A shows, in simplified block diagram form, the architecture of a multimedia on-demand server incorporating disks for storing high-speed versions of a movie.
Figure 5B:
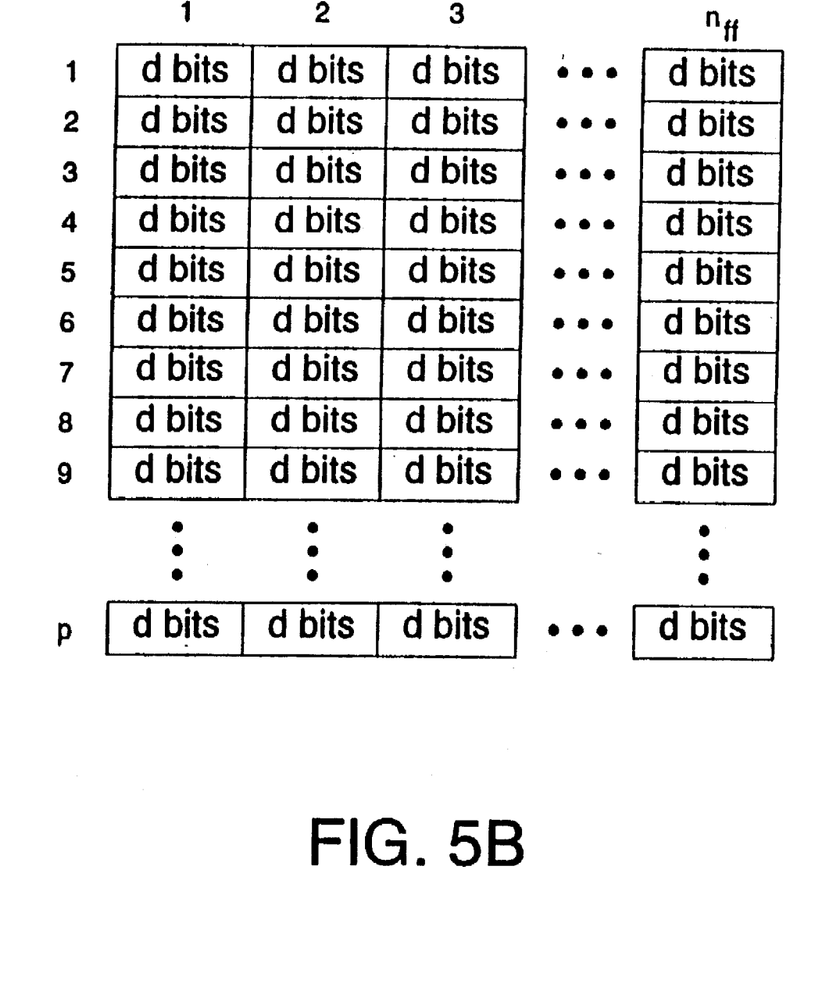
FIG. 5B is a depiction of p-by-$n_{tf}$ matrix arrangement of data representing a movie retrieved from disk 503 of FIG. 5A.

As shown in FIG. 5A, disk 500 is provided to store the fast-forward version. Fast-forward data is stored on disk 500 in column-major form, and can be visualized as being organized in a matrix (see FIG. 5B). The minimum phase difference, $t_p$, for the fast-forward data is approximately $t_f/(k+1)$, and each row of the matrix consists of $n_f$ data portions of size d, where:

$$n_{ff} = \frac{t_{ff} \cdot r_d}{d}.$$

Data from disk 500 is fed to p dedicated fast-forward RAM ("FF-RAM") buffers (only two of which, 501 and 502, are explicitly shown). Each of these FF-RAM buffers has a capacity of d bits, and data representing the frames of the fast-forward version of the movie is stored in and transmitted from these FF-RAM buffers in a circular manner similar to that employed for RAM buffers (108–112). Upon issuing a fast-forward command, the viewer would continue to receive normal speed video until one of the FF-RAM buffers contained the I-frame that would have normally been the closest I-frame to the last P-frame the viewer received prior to issuing the fast-forward command. At this point, the viewer would then receive fast-forward video from which ever FF-RAM buffer that contained the appropriate I-frame. The reception of fast-forward video would continue, with the viewer receiving data from the various FF-RAM buffers in a consecutive fashion. This fast-forward viewing would provide the viewer with a rapid succession of IBBP frame sequences. As with the previously described fast-forward commands, the viewer would return to normal viewing by issuing a resume command. There may be a delay of as long as $t_c$ seconds between the issuance of a resume command and the resumption of normal viewing (n·d bits may need to be stored in and transmitted from one of the normal viewing RAM buffers (108–112) before the particular frame that follows the last received fast-forward IBBP sequence is arrived at).

Disk 503 of FIG. 5A stores the rewind version of the movie. This rewind data is stored, retrieved and provided to a viewer in manner similar to that of the fast-forward data upon disk 500. p rewind RAM ("REW-RAM") buffers (represented by buffers 504 and 505) perform functions analogous to the FF-RAM buffers. The only real difference is that the data stored on disk 503, and the order in which it is retrieved, is opposite that of the fast-forward data upon disk 500.

Figure 6:
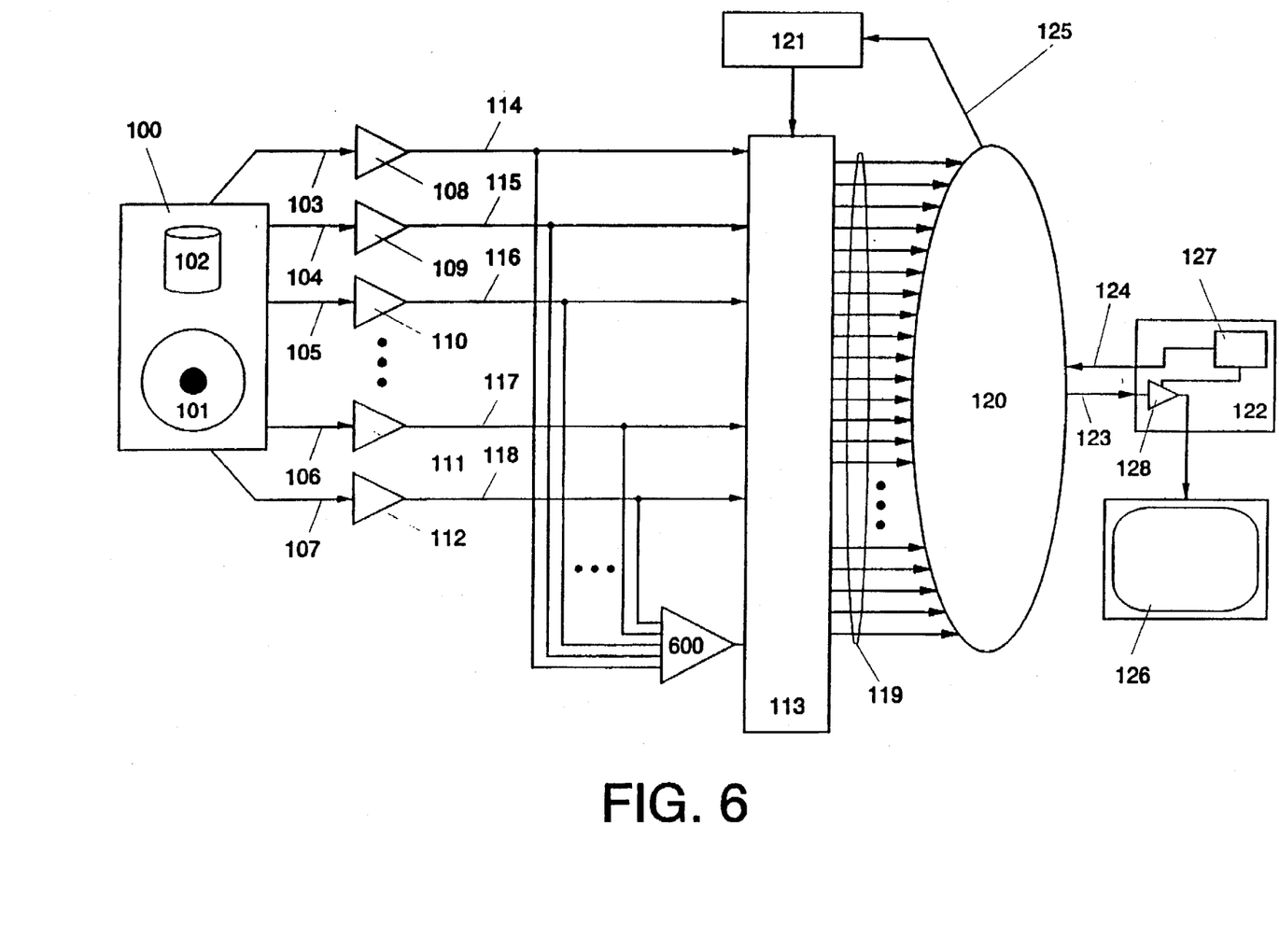
FIG. 6 shows, in simplified block diagram form, the architecture of a multimedia on-demand server incorporating a circular buffer that stores a high-speed version of a movie.

Yet another scheme for implementing reduced granularity fast-forward and rewind functions involves employing a circular RAM buffer arrangement that stores selected bits of a high-speed version of a movie. An embodiment of the invention that incorporates such a high-speed movie RAM ("HSM-RAM") buffer (600) is shown in FIG. 6. A separate one of these HSM-RAMs would be required for each viewer that wishes take advantage of the RAM-based fast-forward and rewind functions.

The input of HSM-RAM buffer 600 is linked to the output of each of the normal speed video ram buffers (108–112). As a particular viewer view's a movie, a fast-forward and rewind high-speed version of the movie is assembled and stored within HSM-RAM buffer 600. Each of these high-speed versions is comprised of (n·d) bits of IBBP frame sequences. The fast-forward version contains the IBBP frames that follow the frame that the viewer is currently receiving, and the rewind version contains the IBBP frames that preceded the frame that the viewer is currently receiving. Storing a high-speed version of the movie consisting of (n·d) bits of the IBBP frames that precede and follow the current frame being viewed will support a continuous fast-forward and rewind functions. In the time that (n·d) bits of the appropriate high-speed version of the movie are transmitted to a viewer, (n·d) bits of normal speed video will also be output by each of the normal speed video RAM buffers (108–112) within the system of FIG. 6. Thus, the (n·d)+1th bit of high-speed video (which is needed for the continued compilation of the high-speed version of the movie) would have been output by a normal speed video RAM buffer during the time that the initial (n·d) bits of the high-speed version were consumed by the viewer. Therefore, this (n·d)+1th bit would have been stored within HSM-RAM buffer 600, and been available for transmission to the viewer as part of the continuing high-speed movie by the time the last of the initial (n·d) bits of the high-speed movie had been consumed.

The amount of storage space, $HSM_{sub}$, occupied by the IBBP sequences that would be contained in (n·d) bits of video data is given by:

$$HSM_{sub} = \frac{(n \cdot d) - IBBP}{k+1} + IBBP \text{ bits};$$

where IBBP is the number of bits required to store a single IBBP sequence. The overall required capacity of HSM-RAM buffer 600 is:

$$(2k+4)HSM_{sub} \text{ bits}.$$

This overall HSM-RAM storage capacity can be viewed as being comprised of 2k+4 separate sub-buffers of size $HSM_{sub}$. These sub-buffers are allocated as follows:

- one sub-buffer stores the high-speed movie data collected from the normal speed video RAM buffer from which the present frame of normal speed video is being transmitted to the viewer;
- k+1 of the sub-buffers store high-speed movie data collected from the k+1 normal speed video RAM buffers following the normal speed buffer from which the present frame of normal speed video is being transmitted to the viewer;
- k+1 of the sub-buffers store high-speed movie data collected from the k+1 normal speed video RAM buffers preceding the normal speed video RAM buffer from which the present frame of normal speed video is being transmitted to the viewer; and
- the remaining sub-buffer is loaded with high-speed movie data in response to rewind and fast-forward commands issued by the viewer. If a fast-forward command is issued, this remaining buffer is loaded with high-speed video data from the k+2nd normal speed video RAM buffer following the normal speed video RAM buffer from which the present frame of normal speed video is being transmitted to the viewer. If a rewind command is issued, this remaining buffer is loaded with high-speed video data from the k+2nd normal speed video RAM buffer preceding the normal speed video RAM buffer from which the present frame of normal speed video is being transmitted to the viewer. This assures that the viewer will always have access to k+1 buffers full of high-speed video information to support the continued performance of whatever high-speed function (rewind or fast-forward) that he or she is currently actuating.

Within the system of FIG. 6, if in the course of viewing a movie at normal speed, a viewer was receiving a frame from RAM buffer 109, data representing all of the IBBP frame sequences contained in the (n·d) bits that preceded the present frame would be collected from normal speed video RAM buffers 108 and 109 and stored in HSM-RAM buffer 600. Likewise, data representing all of the IBBP frame sequences contained in the (n·d) bits that will follow the present frame would be collected from normal speed video RAM buffers 109 and 110, and stored in HSM-RAM buffer 600. These high-speed versions of the movie are stored within HSM-RAM buffer 600 on a circular basis. That is, as the movie being viewed progresses, the contents of HSM-RAM buffer 600 are updated so that it always contains the IBBP sequences from the (n·d) bits of data preceding and following the present frame being transmitted to a viewer from the normal speed video RAM buffers (108–112). This circular storage of high-speed movie data, allows a continuous high-speed version of the movie (either fast-forward or rewind) to be supplied to a viewer throughout the viewing of a movie.

When a viewer issues a fast-forward command, the viewer receives fast-forward video from the sub-buffer within HSM-RAM buffer 600 that contains the IBBP frame sequence that would have normally followed the last P-frame the viewer received prior to issuing the fast-forward command. The reception of fast-forward video would continue, with the viewer receiving IBBP frame sequences in a consecutive order from the various sub-buffers within HSM-RAM buffer 600. As with the previously described fast-forward commands, the viewer would return to normal viewing by issuing a resume command. There may be a delay of as long as $t_c$ seconds between the issuance of a resume command and the resumption of normal viewing (n·d bits may need to be stored in and transmitted from one of the normal speed video RAM buffers (108–112) before the particular frame that follows the last received fast-forward IBBP sequence is arrived at).

The issuance of a rewind command by the viewer would result in the reception of IBBP sequences from the sub-buffer within HSM-RAM buffer 600 that contains the IBBP frame sequence that would have normally preceded the last P-frame the viewer received prior to issuing the rewind command. The reception of rewind video would continue with the viewer receiving IBBP frame sequences in a reverse-consecutive order from the various sub-buffers within HSM-RAM buffer 600. As with the fast-forward command, the viewer would return to normal viewing by issuing a resume command, and there could be a delay of as long as $t_c$ seconds between the issuance of a resume command and the resumption of normal viewing.

In the schemes presented for pause, resume, and those for implementing reduced granularity fast-forward and rewind, require a RAM buffer to contain the first I-frame in the movie following the last P-frame transmitted before normal transmission of bits to the viewer can be resumed. In the worst case, this necessitates a delay of $t_c$ seconds, which some viewers may find unacceptable. This delay may be eliminated if each viewer is provided with a dedicated resumption RAM buffer having a capacity of (n·d) bits. This resumption RAM buffer, which may be collocated with the program library, stores, on a circular basis, the next (n·d) bits of information that would have been transmitted to a particular viewer immediately after that viewer issued a pause, fast-forward, or rewind command. When that particular viewer issues a resume command to continue with the normal viewing of a movie, the contents of the particular resumption RAM buffer associated with that viewer are immediately transmitted to him or her. As this resumption RAM buffer holds the next (n·d) bits of information that the viewer would have received following the issuance of the particular command that he or she is now resuming normal viewing from, the very next frame that the viewer needs to receive is immediately available. With this arrangement, following a resume command, a viewer receives the first (n·d) bits of normal speed video from a resumption RAM buffer, and the frames following these initial bits are provided in the standard fashion.

For a viewer the transition from the bit stream output from the resumption RAM buffer to the one output by a normal speed video RAM buffer will not involve a delay. A period of $(n \cdot d \cdot r_d)$ seconds will have elapsed while the contents of a resumption RAM buffer are transmitted to a viewer. This period is long enough to allow (n·d) bits to be stored in and transmitted from any of the normal speed video RAM buffers; therefore, the particular information representing the frame that should follow the last frame output by a resumption RAM buffer will be available immediately following the transmission of that last frame to a viewer.

The invention also provides for the storage of multiple videos with different rate requirements. In the embodiment described above, the transfer rate, $r_d$, at which program information is transmitted to network 120 from video switch 113 has been assumed to be a uniform 1.5 megabits/second.

However, program information may also be compressed using different compression algorithms and may thus have different transfer rates. For example, movies compressed using the MPEG-1 standard require a transfer rate, $r_d$, of about 1.5 megabits/second, whereas for movies compressed using the MPEG-2 standard, $r_d$ varies between 3 and 12 megabits/second.

The program information on disk 101 may be viewed as a sequence of blocks of size $t \cdot r_t$, where t is an arbitrarily small amount such that $t \cdot r_t$ is a multiple of the unit of retrieval form disk 101. The total number of blocks required to store the multiple videos is q. The movies stored on disk 101 can be referred to as $V_1, V_2, \ldots, V_m$, with transfer rates $r_1, r_2, \ldots, r_m$, where $r_1 \geq r_2 \geq \ldots r_m$, and lengths $l_1, l_2, \ldots, l_m$ seconds, respectively.

The total number of disk blocks q required to store the movies can be computed as follows. If $r_{max} = \max\{r_1, \ldots, r_m\}$, the number of portions that can be stored in a block is at least $r_t/r_{max}$. Since a movie, $V_i$, contains at most $l_i/t$ portions, the total number of blocks required will not exceed:

$$q_{max} = \left\lceil \left( \frac{1}{\left\lfloor \frac{r_t}{r_{max}} \right\rfloor} \cdot \sum_{i=1}^{m} \left\lceil \frac{l_i}{t} \right\rceil \right) \right\rceil$$

An algorithm, PVB, for assigning portions of movies to blocks is used. Variables i, j and k are used to keep track of the portions, videos and blocks respectively. Assuming an initial setting of i=1, j=1, k=1 and $q=q_{max}$, the PVB algorithm is as follows:

1. For movie $V_j$, assign the $i^{th}$ portion of size $t \cdot r_j$ to block k.

2. (a) If k=q then k=1. Else, k=k+1.

(b) If i is the last portion of movie $V_j$, then set j=j+1, i=1. Else, i=i+1.

(c) If j>m, exit. Else, go to Step 1.

Beginning with block 1 on the disk 101 and portion 1 of movie $V_1$, consecutive portions of $V_j$ of size $t \cdot r_j$ are stored in consecutive blocks. After the last portion of a movie $V_j$ is stored in a block, the first portion of video $V_{j+1}$ is stored in the next block. After a portion is stored in block $q_{max}$, the next portion is stored in block 1. The algorithm terminates once the last portion of the movie $V_m$ is stored.

The sum of all the portions assigned to a block does not exceed its size $t \cdot r_t$ because the number of portions assigned to a block by the above algorithm is at most $$\frac{r_t}{r_{max}}.$$

By sequentially reading the q blocks from disk, data for movie $V_i$ is retrieved at a rate $r_i$. The time to retrieve an entire block form disk 101 is t, and the time to consume a portion of size $t \cdot r_i$ at rate $r_i$ is also t. Therefore, in the time it takes to consume a portion of size $t \cdot r_i$, the next block containing the next portion can be retrieved from disk 101.

The portions contained in every block are retrieved into $$\frac{r_t}{r_{max}}$$

RAM buffers (108–112), each of size $2(t \cdot r_{max})$. The retrieval of data, as well as the repositioning of the disk head is handled as described above for movies having a transfer rate, $r_d$, of 1.5 megabits/second.

The value of $q_{max}$ above, is based on the pessimistic assumption that the number of portions per block is $$\left\lfloor \frac{r_t}{r_{max}} \right\rfloor.$$

However, since certain videos may have lower transfer rates than $r_{max}$, it may be possible to store more than $$\left\lfloor \frac{r_t}{r_{max}} \right\rfloor$$

portions per block, and thus reduce the number of blocks required to store the videos. Thus, by assigning to q, a value smaller than $q_{max}$ in the PVB algorithm, it would be possible to support a larger number of phases concurrently and begin phases of a video more frequently (since the time to receive q blocks from disk 101 is q·t, a phase of a video is begun every q·t seconds). The number of buffers of size $2 \cdot t \cdot r_{max}$ required is the maximum number of portions assigned to a block by the PVB algorithm.

A binary search can be used to efficiently compute $q_{acc}$, a more accurate value for q in the PVB algorithm. Two variables, $Q_{min}$ and $Q_{max}$, are used, where $Q_{max}$ is initially set to $q_{max}$, while $Q_{min}$ is set to $$\left\lfloor \frac{\sum_{i=1}^{m}(l_i \cdot r_i)}{t \cdot r_t} \right\rfloor,$$

which is a lower bound on the number of blocks required to store the videos. The minimum number of blocks required to store the videos, $q_{acc}$, lies between $Q_{min}$ and $Q_{max}$. The following steps are repeated in order to generate possible values for $q_{acc}$ between $Q_{min}$ and $Q_{max}$, and to check, for each of the generated values of $q_{acc}$, whether the video can be stored in $q_{acc}$ blocks using the PVB algorithm.

1. If $Q_{max} \leq Q_{min}$, then set $q_{acc}$ to $Q_{max}$ and exit.

2. Assign portions of videos to blocks using the PVB algorithm with q=

$$\left\lceil \frac{Q_{min} + Q_{max}}{2} \right\rceil$$

instead of $q_{max}$.

3. If for every block, the sum of portions assigned to it does not exceed its size $t \cdot r_t$, then set $Q_{max}$ equal to $$\left\lceil \frac{Q_{min} + Q_{max}}{2} \right\rceil.$$

Else, set $Q_{min}$ equal to $$\left\lceil \frac{Q_{min} + Q_{max}}{2} \right\rceil + 1.$$

Go to Step 1.

In the above procedure, if it is determined that the videos cannot be stored in $$\left\lfloor \frac{Q_{min} + Q_{max}}{2} \right\rfloor$$

blocks, then $Q_{min}$ is set to $$\left\lfloor \frac{Q_{min} + Q_{max}}{2} \right\rfloor + 1,$$

else $Q_{max}$ is set to $$\left\lfloor \frac{Q_{min} + Q_{max}}{2} \right\rfloor.$$

Thus, always, $q_{acc}$, the minimum number of blocks required to store the videos lies between $Q_{min}$ and $Q_{max}$. If $Q_{min} \neq Q_{max}$ then $$\left\lfloor \frac{Q_{min} + Q_{max}}{2} \right\rfloor < Q_{max}$$

and $$\left\lfloor \frac{Q_{min} + Q_{max}}{2} \right\rfloor + 1 > Q_{min},$$

and therefore, during each iteration of the procedure, $Q_{max} - Q_{min}$ decreases. When $Q_{max} = Q_{min}$, $Q_{max}$ is the minimum number of blocks required to store the videos.

The use of multiple disks in order to support a larger number of concurrent phases is also contemplated by the invention. MOD servers may need to rely on several disks 101 to store a greater variety of program information or to provide support for a large number of phases, p, concurrently. This can be achieved by storing portions of program information on n disks, using the PVB algorithm in q/n blocks of size $t \cdot r_t$ on each disk. A value of $$\left\lceil \frac{q_{acc}}{n} \right\rceil \cdot n$$

should be assigned to q, where $q_{acc}$ is computed as described earlier assuming a block size of $t \cdot r_t$.

Beginning with portion of 1 of video $V_i$ and block 1 on disk 1, consecutive portions of videos are assigned to the q/n consecutive blocks on disk 1 using the PVB algorithm. If assigning a portion to a block on disk i causes the sum of the portions in the block to exceed $t \cdot r_t$, then the portion is assigned to block 1 on disk i+1, and successive portions are allocated to successive blocks on disk i+1 using the PVB algorithm. If i=n, then it is not possible to store the videos in the q blocks.

The number of portions assigned to blocks on a single disk is uniform; however, blocks on different disks can contain different numbers of portions. As a result, fewer than $$\left\lceil \frac{q_{acc}}{n} \right\rceil \cdot n$$

blocks may suffice to store the videos. An accurate value for q (which is also a multiple of n) can be computed using binary search as follows. Initially, $Q_{max}$ is set to the smallest integer that is greater than or equal to $q_{max}$ and that is a multiple of n. Similarly, $Q_{min}$ is set to the largest integer that is less than or equal to $$\left\lfloor \frac{\sum_{i=1}^{m}(l_i \cdot r_i)}{t \cdot r_t} \right\rfloor,$$

and that is a multiple of n. Note that the minimum value of q required to store the videos lies between $Q_{min}$ and $Q_{max}$. The following steps are repeated in order to determine the minimum value.

1. If $Q_{max} \leq Q_{min}$, then return $Q_{max}$.
2. Set q equal to $$Q_{min} \leq \left\lfloor \frac{Q_{min} + Q_{max}}{2 \cdot n} \right\rfloor_{wxy} \cdot n.$$

3. If the videos can be stored in the q blocks using the above scheme, then set $Q_{max}$ to q. Else, set $Q_{min}$ to q+n. Go to Step 1.

In the above procedure, the values of $Q_{max}$ and $Q_{min}$ are updated in a manner such that the minimum value of q required to store the videos lies between $Q_{min}$ and $Q_{max}$, and $Q_{min}$ and $Q_{max}$ are always multiples of n. Furthermore, if $Q_{min} \neq Q_{max}$, then $$Q_{min} \leq \left\lfloor \frac{Q_{min} + Q_{max}}{2 \cdot n} \right\rfloor \cdot n < Q_{max},$$

and so with every iteration $Q_{max} - Q_{min}$ decreases, and finally, when $Q_{max} = Q_{min}$, is the minimum value of q required to store the videos.

It will be understood that the particular embodiments described above are only illustrative of the principles of the present invention, and that various modifications could be made by those skilled in the art without departing from the scope and spirit of the present invention, which is limited only by the claims that follow. For example, one such modification could include employing optical disks as a storage medium within program library 100. Another modification could utilize multiple disks within the program library to store a program item in order to compensate for small volume disks, unacceptably high disk latencies, or unacceptably low data transfer rates. Furthermore, the on-demand video tape player-like functions disclosed herein may be implemented for multiple videos having different rate requirements or for videos being stored on multiple disks. In addition, the invention can be practiced using a video compression scheme other than MPEG. The particular compression scheme employed need only be capable of providing data to the RAM buffers at a rate in excess of the rate at which data is consumed by viewers during playback, and insert sequences of frames that can be encoded independently at regular intervals.

We claim:

1. A method for storing and transmitting a plurality of sets of program information comprising:

storing said multiple sets of program information on a storage device;

selecting a first set of program information to be transmitted on a transmission medium;

transmitting said selected first set of program information on said transmission medium to independent viewers at a first transfer rate using a first compression algorithm;

selecting a second set of program information to be transmitted on said transmission medium; and transmitting said second set of program information on said transmission medium to other independent viewers at a second transfer rate using a second compression algorithm, said second transfer rate being different than said first transfer rate.

2. The method of claim 1 wherein each said set of program information has a compression algorithm depending upon the program information and an associated transfer rate.

3. The method of claim 2 wherein each said set of program information is stored in a plurality of blocks.

4. The method of claim 3 wherein the total number of blocks required to store said multiple sets of program information is dependent on the largest of said transfer rates.

5. The method of claim 3 wherein the total number of blocks required to store said multiple sets of program information is minimized based on the particular transfer rate of each of said sets of program information.

6. The method of claim 1 wherein said multiple sets of program information are stored on at least one magnetic disk.

7. The method of claim 1 wherein said multiple sets of program information are stored on at least one optical disk.

8. The method of claim 1 wherein said multiple sets of program information are transmitted to a public telecommunications network.

9. The method of claim 1 wherein said multiple sets of program information comprises data representative of a video signal.

10. The method of claim 1 wherein said multiple sets of program information comprises data representative of an audio signal.

11. A method for storing and transmitting a plurality of sets of program information comprising:

storing said multiple sets of program information on a first storage device wherein each set of program information is stored in a plurality of blocks at different transfer rates;

selecting a first set of program information to be transmitted on a transmission medium;

transmitting said first selected set of program information on the transmission medium in blocks to independent viewers at a first transfer rate using a first compression algorithm;

selecting a second set of program information to be transmitted on the transmission medium; and transmitting said second set of program information in blocks on the transmission medium to other independent viewers at a second transfer rate using a second compression algorithm, said second transfer rate being different than said first transfer rate.

12. The method of claim 11 further comprising the step of storing a portion of the beginning of each set of program information in a second storage device.

13. The method of claim 11 further comprising the step of storing a version of one set of the program information in a third memory for reducing granularity between a fast forward function and a rewind function.

14. The method of claim 11 further comprising the step of storing a version of one set of the programs in the third memory for a fast forward version of the program information and in a fourth storage device for a rewind version of the one set of program information.

15. The method of claim 11 further comprising the step of assembling a fast forward and rewind version of the program information in a high speed RAM buffer.

16. The method of claim 11 further comprising the steps of assembling the program set of information in I, P, B and R frames and inserting the R frames in the program information after the first P frame preceding the I frame to pause the program information.

17. The method of claim 11 further comprising the step of storing the sets of program information as assembled frames, each set of frames stored in a buffer for successive transmission to the storage medium.

18. The method of claim 17 further comprising the steps of transmitting the sets of program information until a P frame is transmitted from the buffer and the next consecutive buffer contains an I frame and repeating the previous steps in rapid succession as a fast forward function for a viewer.

19. The method of claim 18 further comprising the step of transmitting the buffer information in the preceding buffer in lieu of the next consecutive buffer as a rewind operation for a viewer.

20. The method of operation of claim 19 wherein transmission of data occurs from whatever buffer is transmitting as a resume function for the viewer.

21. The method of claim 20 further comprising step of selecting a buffer for transmission of data occurring at a specified time in the transmission as a skip backward function for a viewer.

22. The method of claim 21 further comprising the step of selecting a buffer for transmission of data according to a specified amount of time within the program information as a skip forward function for the viewer.

23. The method of claim 11 further comprising the steps of:

storing consecutive portions of the program information in column major form using an algorithm for defining size and consecutive blocks; and retrieving an entire block from the storage device at a rate to permit storage of new program information into the storage device.

* * * * *